United States Patent
Mulligan et al.

(10) Patent No.: US 11,698,980 B2
(45) Date of Patent: Jul. 11, 2023

(54) SYSTEM, DEVICES AND/OR PROCESSES FOR SECURE COMPUTATION ON A VIRTUAL MACHINE

(71) Applicant: ARM IP Limited, Cambridge (GB)

(72) Inventors: Dominic Phillip Mulligan, St. Neots (GB); Derek Del Miller, Austin, TX (US); Shale Xiong, London (GB)

(73) Assignee: Arm Limited, Cambridge (GB)

( * ) Notice: Subject to any disclaimer, the term of this patent is extended or adjusted under 35 U.S.C. 154(b) by 572 days.

(21) Appl. No.: 16/569,444

(22) Filed: Sep. 12, 2019

(65) Prior Publication Data

US 2021/0081545 A1 Mar. 18, 2021

(51) Int. Cl.
- *G06F 21/60* (2013.01)
- *G06F 9/455* (2018.01)
- *H04L 9/32* (2006.01)

(52) U.S. Cl.
CPC ........ *G06F 21/602* (2013.01); *G06F 9/45558* (2013.01); *H04L 9/3242* (2013.01); *G06F 2009/45587* (2013.01)

(58) Field of Classification Search
None
See application file for complete search history.

(56) References Cited

U.S. PATENT DOCUMENTS

| | | | | | |
|---|---|---|---|---|---|
| 2002/0178358 | A1* | 11/2002 | Perkins | ................. | H04L 9/3247 380/258 |
| 2004/0098348 | A1* | 5/2004 | Kawasaki | .............. | G06Q 10/10 705/59 |
| 2005/0257243 | A1* | 11/2005 | Baker | ................... | G06F 21/554 726/1 |
| 2008/0046581 | A1* | 2/2008 | Molina | ................. | H04L 9/3234 709/227 |
| 2009/0293056 | A1* | 11/2009 | Ferris | ................. | G06F 9/45554 718/1 |
| 2014/0283098 | A1* | 9/2014 | Phegade | ............. | H04L 63/0428 726/26 |

OTHER PUBLICATIONS

Notification of Transmittal of the International Search Report and the Written Opinion of the International Searching Authority, or the Declaration, International Application No. PCT/GB2020/052108, dated Oct. 23, 2020, 1 pg.
International Search Report, International Application No. PCT/GB2020/052108, dated Oct. 23, 2020, 4 pgs.
Written Opinion of the International Searching Authority, International Application No. PCT/GB2020/052108, dated Oct. 23, 2020, 9 pgs.

(Continued)

*Primary Examiner* — William J. Goodchild
(74) *Attorney, Agent, or Firm* — Berkeley Law & Technology Group, LLP

(57) ABSTRACT

Briefly, example methods, apparatuses, and/or articles of manufacture are disclosed that may be implemented, in whole or in part, using one or more processing devices to facilitate and/or support participation in computing activities by multiple parties having limited mutual trust. In one embodiment, computation may occur in a secure processing environment (SPE) while one or more untrusted parties reside outside of the SPE.

21 Claims, 8 Drawing Sheets

(56) References Cited

OTHER PUBLICATIONS

Lamya Abdullah, et. al., "Sealed Computation: Abstract Requirements for Mechanisms to Support Trustworthy Cloud Computing", arxiv.org, Cornell University Library, 201 Olin Library Cornell University Ithaca, NY 14853, Jun. 19, 2019 (Jun. 19, 2019), XP081383336, DOI: 10.1007/978-3-030-12786-2_9 the whole document.
Knauth, "Integrating Remote Attestation with Transport Layer Security," https://arxiv.org/abs/1801.05863, Jan. 17, 2018, 11 Pages.
Fisch, "Iron: Functional Encryption using Intel SGX," CCS '17 Proceedings of the 2017 ACM SIGSAC Conference on Computer and Communications Security, Dallas, Texas, USA, Oct. 30, 2017, 37 Pages.
Ohrimenko, "Oblivious Multi-Party Machine Learning on Trusted Processors," Proceedings of the 25th USENIX Security Symposium, Aug. 10-12, 2016, Austin, TX, 18 Pages.
Arnautov, "SCONE: Secure Linux Containers with Intel SGX," Proceedings of the 12th USENIX Symposium on Operating Systems Design and Implementation (OSDI '16), Nov. 2-4, 2016, Savannah, GA USA, 17 Pages.
Bauman, "Shielding applications from an untrusted cloud with Haven," 11th USENIX Symposium on Operating System Design and Implementation, Oct. 6, 2014, 17 Pages.
Dierks, "The Transport Layer Security (TLS) Protocol Version 1.2," https://tools.ietf.org/html/rfc5246, Aug. 2008, 104 Pages.
Notification Concerning Transmittal of International Preliminary Report on Patentability, App. No. PCT/GB2020/052108, dated Mar. 4, 2022, 8 pages.

\* cited by examiner

SYSTEM, DEVICES AND/OR PROCESSES FOR SECURE COMPUTATION ON A VIRTUAL MACHINE

BACKGROUND

1. Field

The present disclosure relates generally to implementation of computing resources available to provide secure computing resources for computing clients.

2. Information

There are strong economic, practical and/or technical incentives to defer and/or delegate aspects of computations among multiple parties. For example, such delegation of computation may include delegation of computation into a "cloud"—with a cloud host acting as a delegate, providing computational services. Other examples may include, for example, ancestry testing services such as 23andMe, which may provide computation services and/or perform computations on genetic data extracted from customer-provided cheek swabs, for example. With an ever-increasing number of software- and/or computation-based services on offer, a number of delegated computations is sure to increase as well.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
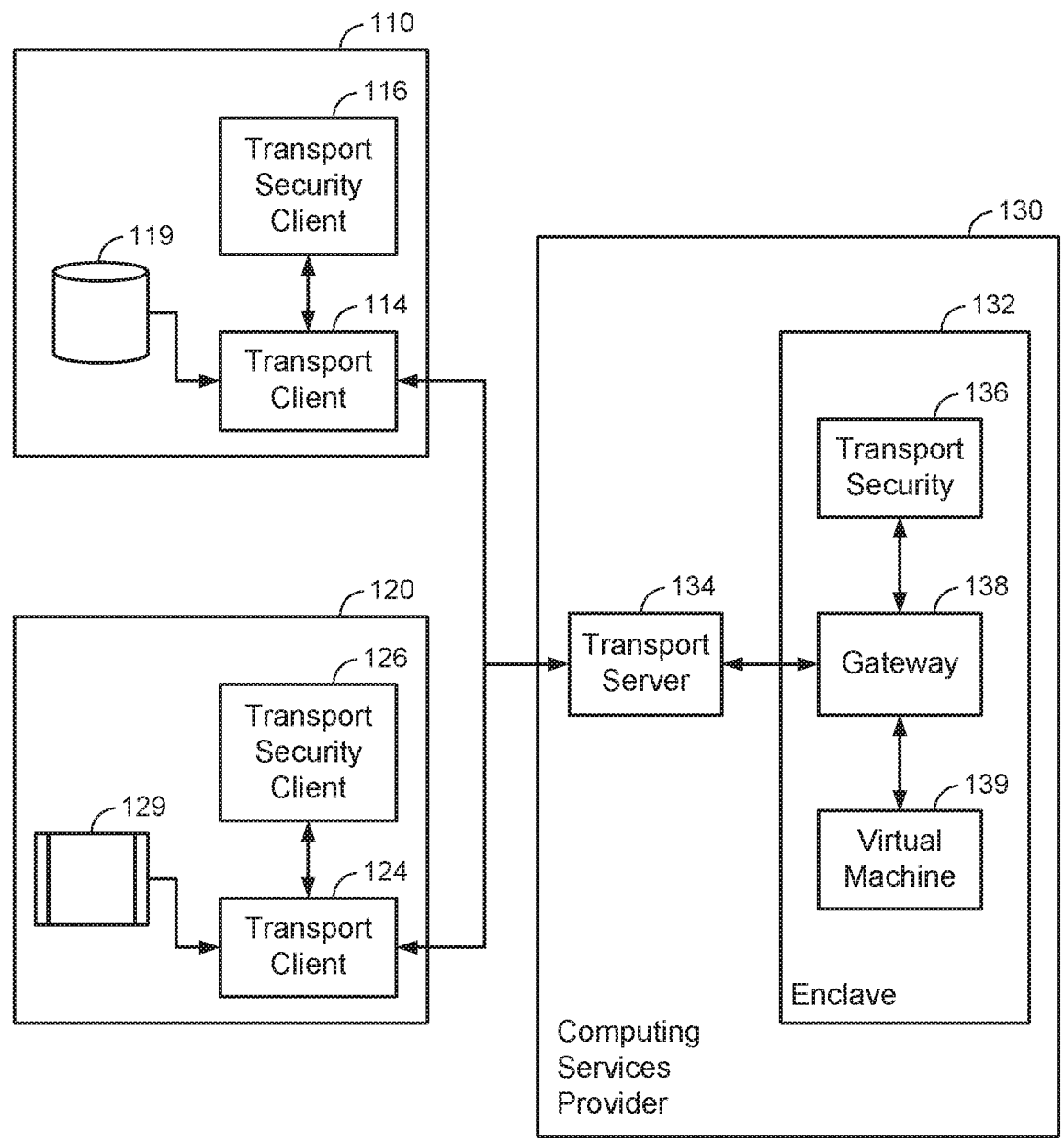
FIG. 1 is a schematic diagram of an example system to computing resources for computing clients according to embodiments.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Currently, delegated computations may rely on sharing of secret and/or proprietary parameters with a delegate. A delegating party—e.g., an agent tasking a delegate to perform a computation on their behalf may distribute and/or otherwise source some secret and/or proprietary parameters in order for such computation to take place. This may entail a delegate to meet some minimum threshold for trustworthiness in order to satisfy a delegating party. For relatively low-value computations being delegated to major cloud hosts such as Amazon, Google, or Microsoft, for example, this threshold may be trivially met in that a major cloud host is unlikely to risk reputational damage from spying on, or caching the results of, a customer's computations. For more sensitive computations—such as those relating to health, finance, business, or even national security—a minimum threshold for trust may be much harder to meet, if possible at all. Health services, in particular, possess troves of valuable records that could be mined by interested parties, extracting knowledge ordinarily considered important to wider society (e.g., by pharmaceutical companies developing new drugs, demographers conducting population-scale studies, think-tanks developing public policy, just to highlight three examples). This opening-up of records may lead to significant societal advances.

Yet, given risks of inadvertent disclosure of records, and associated public hostility to the idea of record sharing, health services and other guardians of sensitive records conservatively opt not to share. Instead, they may act as silos, hoarding records. Nevertheless, formation of record silos may be perfectly rational for one or more of the following reasons:

1. Even in cases where a computing delegate may be otherwise be expected to meet some acceptable minimum threshold of trust, accidental breaches of secret and/or proprietary parameters may occur with regularity. While reputational damage may often be a strong motivator for companies to "do the right thing", there may still be no accounting for an unfortunate accident, malpractice and/or criminal targeting of an entity in order to obtain access to secret and/or proprietary parameters.

2. Social, legal and/or business environment within which a computing delegate operates may shift. As a result a computing delegate may find itself compelled and/or tempted in order to maximize profits, to share and/or sell-off secret and/or proprietary parameters to third parties without controls established by an originator of such secret and/or proprietary parameters, unless especial care is taken to prevent this. Computing delegates deemed trustworthy today may not necessarily be trustworthy tomorrow, yet sharing of secret and/or proprietary parameters may be essentially an irreversible act since once released, secret and/or proprietary parameters may be difficult to control, corral and/or track.

3. A value and/or sensitivity of shared secret and/or proprietary parameters may only become apparent after such secret and/or proprietary parameters are shared. For example, a true value and insight that may be extracted from particular sets of secret and/or proprietary parameters may be yet to be fully appreciated both by the general public and/or by experts alike. Moreover, an ability to derive value and/or insight from particular proprietary parameters may be ever-increasing. Particular sets of secret and/or proprietary parameters of low imagined value today may be highly valuable tomorrow.

4. Plausible-sounding anonymisation methods for sensitive sets of secret and/or proprietary parameters, such as removing obviously-identifying fields such as names, may not be entirely effective. This may be especially true if an adversary has an ability to cross-reference entries in multiple sets of secret and/or proprietary parameters, leading to several instances of deanonymisation in supposedly-anonymised secret and/or proprietary parameters. Moreover, it may be difficult to estimate which fields in a set of proprietary parameters may be useful for deanonymisation purposes prior to release. For example, one study found that 87% of the population of the United States may be uniquely identified from their ZIP code, gender, and birth date. In another prominent example, anonymised proprietary parameters released by Netflix still contained enough attributes to tie entries to individuals with ease.

Accordingly, it may evident that there may be a risk of sharing secret and/or proprietary parameters that in hindsight should not have been shared. Similarly, it may be evident that there is a risk of previously shared secret and/or proprietary parameters being inadvertently leaked.

There may be a fundamental tension between delegation, and sharing of secret and/or proprietary parameters, and strong guarantees of privacy. While privacy may be sold as an ipso facto societal good in its own right, note here that motivation for privacy may be more concrete in that privacy may be an economic enabler, allowing an unlocking of value and insight from record silos that may otherwise be locked away. A strong, verifiable guarantee of privacy may allow guardians of record silos to share contents of their respective records while maintaining control over which parties may access such contents of records, and a manner in which such parties may have access. Moreover, with guarantees of secrecy, guardians of sensitive records may freely delegate processing of secret and/or proprietary parameters to other parties, safe in the knowledge that these secret and/or proprietary parameters cannot be shared—purposefully or accidentally—even if the delegate's circumstances and/or business model changes. Privacy, in this sense, may comprise a means of asserting ownership and control over secret and/or proprietary parameters.

According to an embodiment of a secure, delegated computing paradigm, multiple different participating parties such as, for example, a computing entity, a program input provider entity and/or a program provider entity, may not have an established framework of mutual trust. In an implementation, a computing entity may maintain hardware and/or software resource to, for example, perform computing services for client entities according to a contractual arrangement. For example, a program input provider entity may own and/or control various sets of secret and/or proprietary parameters to be processed by hardware and/or software resources owned and/or controlled by such a computing entity. Additionally, a computing entity may perform services to process sets of secret and/or proprietary parameters for a program input provider entity according to computer readable instructions and/or code provided by a program provider entity (e.g., having a separate contractual arrangement with the computing entity and/or program input provider entity).

In an implementation, a program provider entity may own and/or control a proprietary program "$\pi$" (e.g., expressed as code and/or computer readable instructions stored as signals and/or states on a non-transitory storage medium) comprising trade secrets (e.g., processing techniques and/or algorithms) that are to be concealed from other parties such as, for example, computing entities (e.g., to execute $\pi$) and/or client program input provider entities. A program input provider may own and/or control certain secret and/or proprietary parameters "D" (e.g., stored as signals and/or states representing an array of machine words) that may be processed in some fashion according to proprietary program $\pi$. Additionally, a computing entity, possibly distinct from a program input provider owning and/or controlling D and a program provider owning and/or controlling $\pi$ may execute $\pi$ based, at least in part, on D to provide a computing result $\pi(D)$.

In a particular scenario, a program input provider providing D may be concerned about disclosure of D and/or $\pi(D)$ to other parties including a program provider entity owning and/or controlling $\pi$ and/or a computing entity that is to execute $\pi$ for determination of $\pi(D)$. A program input provider providing D may also be concerned about a program provider owning and/or controlling $\pi$ provides a correct program (e.g., correct and/or latest version and not a substitute program) to a computing entity that is to compute $\pi(D)$. Additionally, a program provider entity owning and/or controlling $\pi$ may be concerned about disclosure of details and/or proprietary secrets concerning content of $\pi$ to, for example, a program input provider providing D and/or a computing entity that is to execute $\pi$ to compute $\pi(D)$. Furthermore, a computing entity that has agreed to compute $\pi(D)$ may be concerned about possible damage to hardware and/or software computing resources by execution of $\pi$ to determine $\pi(D)$.

As pointed out above, a program input provider entity providing D, a program provider entity providing $\pi$ and/or a computing entity to execute $\pi$ compute $\pi(D)$ may not have an established framework of mutual trust. Moreover, any one principal party may assume that the other two are potentially actively collaborating, in order to undermine the principal party. Nevertheless, all three may wish to collaborate in order to realise a computing result π(D). In addition to concerns outlined above, principals above may also have concerns regarding additional parties that may eavesdrop and/or actively attack such as by observing and/or caching plaintext messages transmitted between and/or among a program input provider entity providing D, a program provider entity providing π and/or a computing entity to execute π to compute π(D).

According to an embodiment, a computing entity to compute π(D) may employ one or more secure enclave computing devices as part of a Secure Processing Environment (SPE) to provide a root of trust among parties in a collective participation of computation of π(D). Attestation reports transmitted between and/or among participants in a computation of π(D) may provide at least some assurances that details and/or proprietary secrets concerning content of π would not be disclosed, that secret and/or proprietary parameters D would not be disclosed, that a program provider entity owning and/or controlling π provides a correct program, and/or that computing resources owned and/or controlled by a computing entity would not be damaged in attempting to compute π(D). In an embodiment, a computing entity to compute π(D) may employ one or more secure enclave computing devices to at least in part execute π for the determination of π(D). A provider of such one or more secure enclave computing devices may comprise a neutral and/or trusted party to validate and/or verify attestation reports transmitted between and/or among participants in computation of π(D) to at least in part provide a root of trust among parties in a collective participation in computation of π(D).

For simplicity, the above description is directed to a program π to be provided by a single party/entity, and secret and/or proprietary parameters D to be provided by a single party/entity for computation of a result π(D) in an SPE. In specific implementations, components of a program π may be supplied by multiple, different parties to be integrated in an SPE. For example, multiple different program provider entities may provide component modules to be linked and/or compiled at a computing device within an SPE for execution as a single program. Additionally, secret and/or proprietary parameters D may be provided by multiple, different program input provider entities for processing in an SPE for determining a result π(D).

FIG. 1 is a schematic diagram of an example system 100 comprising computing resources for computing clients according to embodiments. According to an embodiment, a program provider entity 120 (e.g., providing a program π), a program input provider entity provider entity 110 (e.g., provider of secret and/or proprietary parameters D) and computing entity 130 (e.g., to compute π(D)) may exchange messages over a communication network to at least in part process secret and/or proprietary parameters to provide a computing result (e.g., π(D)). In an embodiment, a program input provider entity 110 may maintain secret and/or proprietary parameters (e.g., D) as signals and/or states stored in a storage 119, program provider entity 120 may maintain a program (e.g., that is to determine how secret and/or proprietary parameters are to be processed) as signals and/or states stored in a storage 129 and computing entity 130 may comprise a secure enclave computing device 132 to execute a program provided by program provider entity 120 to determine a computing result (e.g., to compute π(D)).

As pointed out above, while FIG. 1 shows a single program input provider entity 110 and a single program provider entity 120, it should be understood that particular implementations may include multiple, distinct program input provider entities (e.g., providing distinct portions of secret and/or proprietary parameters to be processed for determining a computing result) and/or multiple distinct program provider entities (e.g., providing distinct modules to be linked and compiled at an SPE for execution to provide a computing result).

In this context, a "secure enclave computing device" as referred to herein means a combination of software and hardware features integrated to provide an isolated computing environment within a larger computing environment enabling one or more guarantees for applications executing within the secure enclave computing device. In one particular implementation, a secure enclave computing device may comprise a processing environment within a larger computing system which 1) a memory, 2) cryptographic keys, and/or 3) instruction set are maintained as separate from computing resources of such a larger computing system. For example, a secure enclave computing device may comprise a processor to execute separately from a processor controlling a larger computing system, and comprise a memory that is inaccessible by an operating system of the larger computing system (e.g., physically separate memory and/or controlling encryption of signals and/or states stored in a shared memory). In an example implementation, a secure enclave computing device may comprise computing resources to execute computer readable instructions formatted, at least in part, according to a version of Intel® Software Guard Extensions (Intel® SGX). It should be understood, however, that this is merely an example of how computer readable instructions may formatted for execution by computing resources in a secure enclave computing device, and claimed subject matter is not limited in this respect.

According to an embodiment, transport server 134, and transport clients 114 and 124 may establish and/or maintain a transport layer infrastructure (e.g., TCP/IP) suitable for an exchange of messages between and/or among program provider entity 120 using communication formats according to higher levels of abstraction (e.g., HTTP, MQTT, CoaP, LoRa, WiSUN, Zigbee, etc.). According to an embodiment, secure enclave computing device 132 may comprise a transport security entity 136 capable of establishing a secure exchange of messages with program input provider entity 110 and/or program provider entity 120 through transport security clients 114 and 124 over transportation layer infrastructure established and/or maintained between and/or among transport server 134, and transport clients 114 and 124. For example, transport server 134, and transport clients 114 and 124 may establish secure sessions according to a particular cryptographic communication protocol such as, for example, transport layer security (TLS), just to provide an example.

According to an embodiment, secure enclave computing device 132 may comprise computing resources (e.g., processor(s), buses, memory and/or executable instructions) to, among other things, establish a virtual machine 139 to perform computations (e.g., provide a computing result for π(D)). In this context, a "virtual machine" as referred to herein means an emulation of one or more aspects of a computer system to host execution of one or more programs (e.g., expressed as signals and/or states stored in a non-transitory computer readable medium). In one example implementation, a virtual machine may emulate behavior of one or more aspects of a computer architecture (e.g., specialized hardware and/or software) to provide functionality of a physical computing device. In another example implementation, a virtual machine may provide functionality enabling execution of an entire operating system. It should be understood, however, that these are merely example aspects of a virtual machine, and that claimed subject matter is not limited in this respect.

As pointed out above, computing entity 130 may be concerned about damage to computing resources owned and/or maintained by computing entity 130 in the course of executing a program provided by program provider entity 120 (e.g., π) to process secret and/or proprietary parameters provided by input provider entity 110 (e.g., D) to provide a computing result (e.g., π(D)). Such damage may include or arise from, for example, modification of other programs via a row hammer attack, exfiltration of other programs' files or records via side channel attacks, loading of a host machine's hard disk drive with rubbish, exfiltration of signals and/or states stored on disk, etc. In an embodiment, a virtual machine 139 may protect computing resources from both "physical" (e.g., Rowhammer) and "logical" (e.g., virus-like behaviors) attack. According to an embodiment, virtual machine 139 may comprise an executable image (e.g., comprising executable instructions maintained as signals and/or states in a memory (not shown)) to emulate one or more aspects of a computing system capable of executing instructions for a program provided by program provider entity 120 for use in processing secret and/or proprietary parameters provided by program input provider entity 110. According to an embodiment, virtual machine 139 may not emulate all aspects and/or functionality of a particular computing system that are to be emulated. For example, virtual machine 139 may not emulate particular aspects and/or functionality of a computing system that may damage computing system hardware and/or software, and/or disclose instructions of a program that is to be execute, input parameters for such a program, intermediate computing results and/or final computing results. In one example implementation, an executable image for virtual machine 139 may comprise a subset of operation codes of a compiler which omits one or more operation codes based, at least in part, on at least one vulnerability of computing resources (e.g., vulnerability to damage as indicated above) in the course of execution of the omitted one or more operation codes of the compiler. For example, bytecode for an executable image for virtual machine 139 may comprise a sufficient set of operation codes (e.g., arithmetic, logical, control-flow, data movement) to host execution of a wide range of programs of interest including, for example, machine learning algorithms, genomic or genetic algorithms and/or other similar pure functions from arrays of machine words to arrays of machine words, just to provide a few examples. In particular implementations, bytecode forming an executable image for virtual machine 139 may comprise a subset of machine instructions and/or bytecode selected from a commercially available compiler and/or interpreter such as, an Arm Limited compiler and/or WebAssembly compiler, or a subset of machine instructions and/or bytecode selected from a proprietary compiler and/or interpreter and/or a just-in-time compiler and/or interpreter, just to provide a few examples.

According to an embodiment, source code of an executable image maintained by virtual machine 139 and/or source code of an entirety of software system code (e.g., including source code for virtual machine 139) to be installed on secure enclave computing device 132 may be available to program provider entity 120 and/or program input provider entity 110 to enable verification of correctness of an implementation of virtual machine 139 on secure enclave computing device 132. Here, trust may be in part established between program provider entity 120 and program input provider entity 110 that an executable image maintained by virtual machine to provide an intended computing result to faithfully compute a result (e.g., π(D)). Additionally, program input provider entity 110 may be at least in part assured that virtual machine 139 would not cache and/or declassify (e.g., by a "print file" statement and/or opening of a socket to allow access by an untrusted third party) secret and/or proprietary parameters provided by program input provider entity 110. Furthermore, program provider entity 120 may be at least in part assured that virtual machine 139 would not cache and/or declassify a program provided by program provider entity 120. For example, software system code to include code for virtual machine 139 may be open for inspection/verification by, for example, program input provider entity 110 and/or program provider entity 120 (e.g., to ensure that secret and/or proprietary parameters and/or details of a program would not be disclosed without authorization).

According to an embodiment, secure enclave computing device 132 executing virtual machine 139 may be embedded with an untrusted server host, and/or the like including transport server 134. For example, transport server 134 may accept connections and/or forward messages between secure enclave computing device 132 and program provider entity 120 or program input provider entity 110, for example. In an implementation, additional security measures implemented at least in part in transport security entity 136 may prevent computing entity 130 and/or a third party from observing and/or caching content (e.g., plaintext messaging) transmitted between secure enclave computing device 132 and either program provider entity 120 or program input provider entity 110. Furthermore, particular implementations may prevent and/or mitigate controlled side-channel attacks and/or other potential compromises to a guarantee of privacy implemented within secure enclave computing device 132. According to an embodiment, access to a computing result (e.g., π(D)) may be determined based, at least in part, according to a policy such as a policy published by computing entity 130. Such a policy may be agreed upon by program provider entity 120, program input provider entity 110 and/or computing entity 130 in advance of computation for determination of a computing result. For example, particular implementations of a policy governing access to a computing result may prevent unauthorized access by computing entity 130 to a computing result (e.g., π(D)).

According to an embodiment, program provider entity 120 or input provider entity 110 may establish key-pairs for any one of several asymmetric encryption techniques such as, for example RSA, Diffie-Helman, Elliptic Curve, a proposed post-quantum cryptographic algorithm, just to provide a few examples. For example, input provider entity 110 may establish public and private keys denoted as Ka and $Ka^{-1}$, respectively. Similarly, program provider entity 120 may establish public and private keys denoted as Kb and $Kb^{-1}$, respectively. Denoting an encryption of an object θ (e.g., θ=D or π) according to any public key Kx as $\{\theta\}_{Kx}$, public and private key pairs $Ka/Ka^{-1}$ and $Kb/Kb^{-1}$ may satisfy coherency conditions according to expressions (1) and (2) as follows:

$$\{\{\theta\}_{Kx^{-1}}\}_{Kx} = \theta \quad (1)$$

$$\{\{\theta\}_{Kx}\}_{Kx^{-1}} = \theta \quad (2)$$

Figure 2:
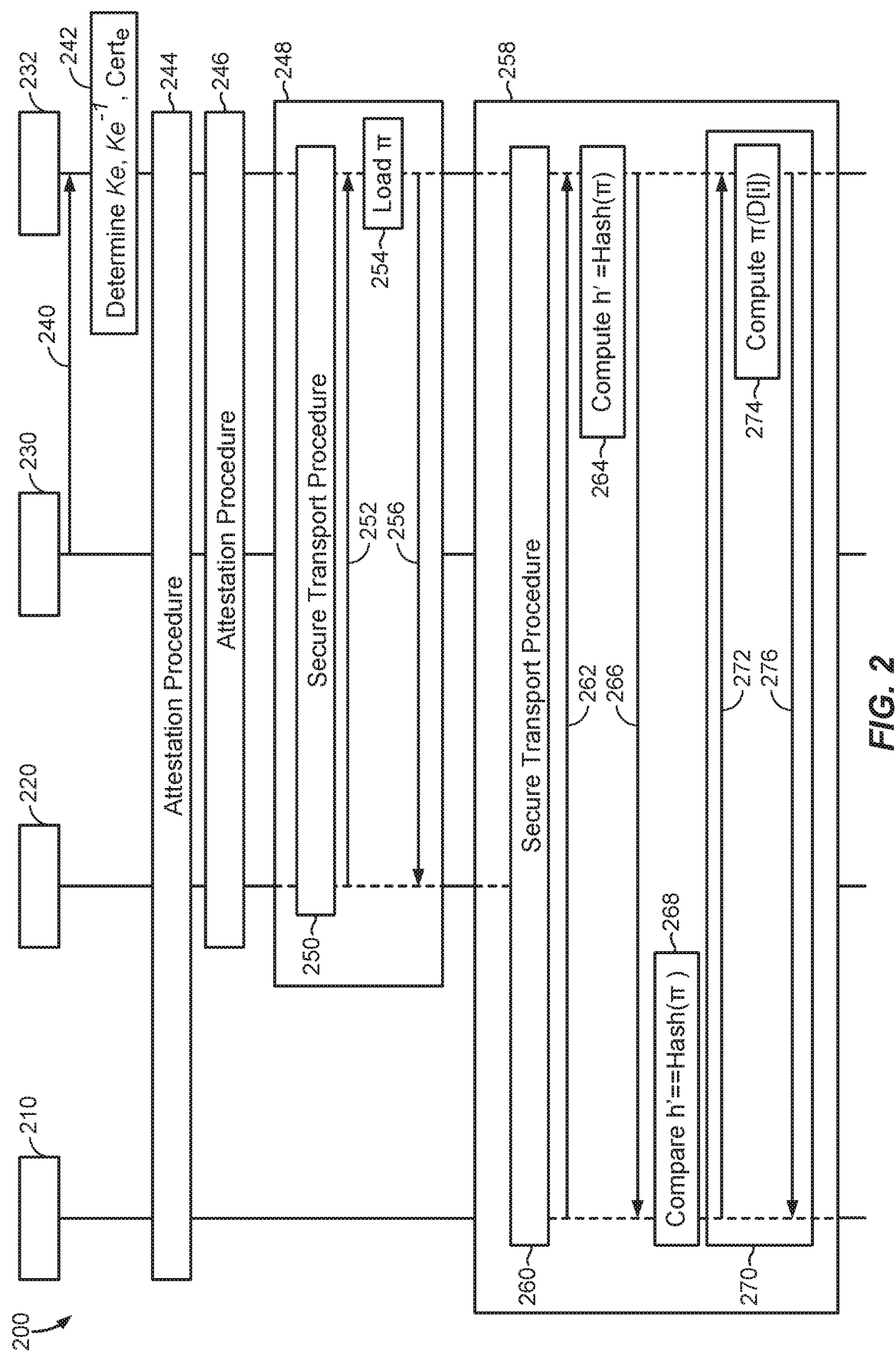
FIGS. 2 through 4 are message flow diagrams of example exchanges of messages between and/or among entities to provide computing resources for computing clients according to particular embodiments.

FIG. 2 is a message flow diagram of an example exchange of messages between and/or among entities including a program input provider entity 210, program provider entity 220, computing entity 230 and secure enclave computing device 232. In a particular implementation, program input provider entity 210, program provider entity 220, computing entity 230 and secure enclave computing device 232 may comprise one or more features of input provider entity 110, program provider entity 120, computing entity 130 and secure enclave computing device 132, respectively, described above with reference to FIG. 1. For example, secure enclave computing device 232 may comprise one or more computing devices to reside in an SPE and installed by a trusted manufacturer and/or integrator of hardware and/or software resources making up secure enclave computing device 232. Prior to transmission of message 240, public and private key pairs Ka/Ka$^{-1}$ and Kb/Kb$^{-1}$ may be established for input provider entity 210 and program provider entity 220, respectively. In a particular implementation, key pairs Ka/Ka$^{-1}$ and Kb/Kb$^{-1}$ satisfy expressions (1) and (2) above, and be maintained as signals and/or states in memories maintained at input provider entity 210 and program provider entity 220, respectively. Additionally, program input provider entity 210 and program provider entity 220 may have established self-signed digital certificates Cert$_a$ and Cert$_b$, respectively. In an embodiment, Cert$_a$ and Cert$_b$ may comprise electronic documents that may be used to verify and/or authenticate ownership of public key Ka by input provider entity 210 and ownership of public key Kb by program provider entity 220, respectively. For example, Cert$_a$ may comprise one or more parameters including a unique identifier associated with input provider entity 210 in a body portion of Cert$_a$ and a cryptographic hash of such a unique identifier associated with input provider entity 210 computed according to private key Ka$^{-1}$ in a signature portion of Cert$_a$. Likewise, Cert$_b$ may comprise one or more parameters including a unique identifier associated with program provider entity 220 in a body portion of Cert$_b$ and a cryptographic hash of such a unique identifier associated with program provider entity 220 signature portion of Cert$_b$ computed according to private key Kb$^{-1}$.

Memories maintained by input provider entity 210 and/or program provider entity 220 may also store as signals and/or states expressing a cryptographic expression M, which may comprise a cryptographic hash and/or cryptographic digest of a portion of system code that may be used to derive an executable image for a virtual machine installed to secure enclave computing device 232 (e.g., executable image for virtual machine 139 in FIG. 1). In an example implementation, such system code to derive an executable image for a virtual machine installed to secure enclave computing device 232 may comprise system code that is publicly available as open source code, for example. As such, cryptographic expression M may comprise a cryptographic hash and/or cryptographic digest of at least a portion of such publicly available system code. Furthermore, program input provider entity 210 may maintain a cryptographic value of at least a portion of code making up a program that is to be provided by program provider entity 220 (e.g., π) and hosted on a virtual machine of secure enclave computing device 232 to process secret and/or proprietary parameters (e.g., D) to be provided by program input provider entity 210. Such a cryptographic value may comprise a hash of a least a portion of code of a program expected to be provided by program provider entity 220 and may be denoted as "Hash (π)" and stored as signals and/or states in a memory at a program input provider entity 210. In an embodiment, a cryptographic value comprising a hash of at least a portion of code of a program expected to be provided by program provider entity 220 may be obtained from a publicly available source and/or from program provider entity 220 directly. Also, computing entity 230 may maintain public keys Ka and Kb, and digital certificates Cert$_a$ and Cert$_b$ as signals and/or states in a memory.

Computing entity 230 may transmit message 240 to secure enclave computing device 232 comprising digital certificates Cert$_a$ and Cert$_b$. Program input provider entity 210 may transmit one or more messages to secure enclave computing device 232 to initiate attestation procedure 244, and program provider entity 220 may transmit one or more messages to secure enclave computing device 232 to initiate attestation procedure 246. As discussed below in connection with the specific implementation of FIG. 3, attestation procedures 244 and 246 may comprise an exchange of messages to, among other things, establish trust in public key Ke established for secure enclave computing device 232, and confirm and/or validate that secure enclave computing device 232 is to process secret and/or proprietary parameters provided by input provider entity 210 using a particular executable image as intended. In an embodiment, trust in public Ke may be established, at least in part, by a party that has contracted with computing entity 230 to be a manufacturer and/or integrator of hardware and/or software to comprise secure enclave computing device 232. In a particular implementation as discussed below, attestation procedures 244 and 246 may comprise an exchange of messages with a trusted provider (not shown) of secure enclave computing device 232 to at least in part validate that secure enclave computing device 232 is to process secret and/or proprietary parameters provided by program input provider entity 210 using a particular executable image as intended.

Following a validation through attestation procedure 246, process 248 may comprise an exchange of messages between program provider entity 220 and secure enclave computing device 232 for loading of a program (e.g., π) to be hosted on a virtual machine (e.g., virtual machine 139) installed on secure enclave computing device 232. Here, secure transport procedure 250 may comprise an exchange of messages between program provider entity 220 and secure enclave computing device 232 at least in part to establish trust and a secure channel for transmission of messages containing signals and/or states of code such a program (e.g., π) to be hosted on a virtual machine installed on secure enclave computing device 232. In a particular implementation, secure transport procedure 250 may be carried out according to one or more aspects of a message flow shown in FIG. 4 discussed below, for example. Following secure transport procedure 250, program provider entity 220 may transmit message 252 comprising signals and/or states expressing code for a program to be hosted on a virtual machine installed on secure enclave computing device 232. Receiving message 252, secure enclave computing device 232 may load a program to a virtual machine (e.g., load program such as π to a virtual machine such as virtual machine 139) based, at least in part, on signals and/or states obtained from message 252, and transmit message 256 to program provider entity 220 confirming that intended program π has been loaded.

Process 258 may comprise an exchange of messages between program input provider entity 210 and secure enclave computing device 232 for determination of a computing result based, at least in part, on signals and/or states expressing a program loaded to a virtual machine at block 254 and secret and/or proprietary parameters (e.g., D) to be provided by program input provider entity 210. Here, a secure transport procedure 260 may comprise an exchange of messages between program input provider entity 210 and secure enclave computing device 232 to establish trust, and establish a secure channel for transmission of messages containing signals and/or states representing secret and/or proprietary parameters to be provided by input provider entity 210 (e.g., D). In a particular implementation, secure transport procedure 260 may be carried out according to one or more aspects of a message flow shown in FIG. 4, for example. Following secure transport procedure 260, input provider entity 210 may transmit message 262 requesting a hash of at least a portion of code of a program loaded at block 254. Receiving message 262, secure enclave computing device 232 may compute a hash of at least a portion of code of a program (e.g., π) received at message 252 (from program provider entity 220) and loaded to a virtual machine at block 254 denoted as h'. Secure enclave computing device 232 may then transmit message 266 to input provider entity 210 containing signals and/or states representing h'. Program input provider entity 210 may then at block 268 compare a value for h' with a cryptographic value (e.g., cryptographic value Hash(π)) to confirm that a correct program had been loaded to a virtual machine installed at secure enclave computing device 232 (e.g., at block 254). Responsive at least in part to a confirmation at block 268 that a correct program had been loaded to a virtual machine installed at secure enclave computing device 232, input provider entity 210 may transmit a message 272 to secure enclave computing device 232 comprising signals and/or states expressing secret and/or proprietary parameters (e.g., D) to be processed according to a program loaded at block 254. At block 274, secure enclave computing device 232 may compute a result (e.g., π(D)) by, for example, execution of a program (e.g., loaded at block 254) hosted on a virtual machine installed on secure enclave computing device 232 to process secret and/or proprietary parameters provided in message 272. Secure enclave computing device 232 may transmit message 276 to program input provider entity 210 comprising signals and/or states expressing a computing result obtained at block 274. In alternative embodiments, message 276 may be transmitted (e.g., following a secure transport procedure other than secure transport procedure 250 or 260) to program provider entity 220 or other party (not shown) based on an agreed policy among participants.

Figure 3:
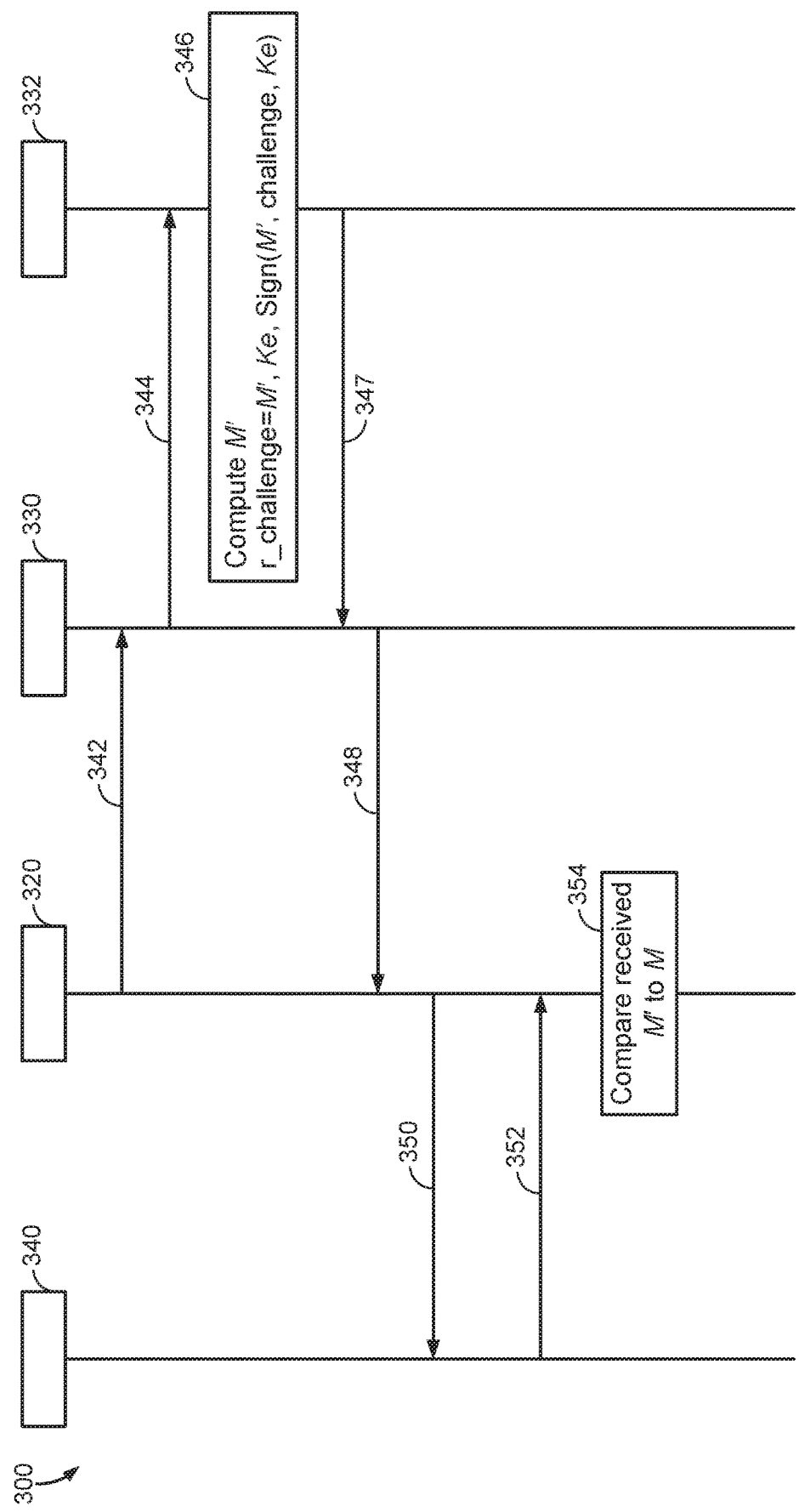

FIG. 3 is a message flow diagram of an implementation of an example attestation process 300 according to an embodiment. Example attestation process 300 may comprise an implementation of attestation procedures 244 and/or 246 (FIG. 2) according to embodiments. In an example embodiment, computing entity 330 may comprise a specific implementation of computing entity 130 and/or 230. Similarly, secure enclave computing device 332 may comprise a specific implementation of secure enclave computing device 132 and/or 232. Secure enclave computing device provider 340 may comprise an entity and/or party that provides hardware and/or software of secure enclave computing device 332 to operate in a SPE. For example, secure enclave computing device provider 340 may comprise a party that has contracted with computing entity 330 to be a manufacturer and/or integrator of hardware and/or software resources to comprise secure enclave computing device 332. In an embodiment, secure enclave computing device provider 340 may be trusted by program input provider entity 210 and/or program provider entity 220. In the particular illustrated embodiment, among other things, process 300 may provide an attestation to a challenging entity 320 that an expected system code including code for implementation of a virtual machine (e.g., virtual machine 139 shown in FIG. 1) is installed to secure enclave computing device 332.

In particular implementations, a challenging entity 320 may comprise program input provider entity 210 (e.g., as in an implementation of attestation procedure 244 as shown in FIG. 2) or comprise program provider entity 220 (e.g., as in an implementation of attestation procedure 264 shown in FIG. 2). Challenging entity 320 may transmit an attestation request message 342 to comprise an identifier "challenge," which may be forwarded to secure enclave computing device 332 through computing entity 330 as message 344. Responsive at least in part to receipt of message 344, secure enclave computing device 332 may compute a cryptographic attribute M' of system code implemented on secure enclave computing device 332 that is to include a virtual machine to host a program provided by a program provider entity (e.g., program provider entity 120 and/or 220 such as to be loaded at block 254. According to an embodiment, secure enclave computing device provider 340 may provision a private attestation key that is to be maintained within and applied by secure enclave computing device 332, and to be inaccessible by computing entity 330, for example. In a particular implementation, cryptographic attribute M' may comprise, for example, a cryptographic hash and/or cryptographic digest computed according to an appropriate cryptographic hashing technique such as SHA-256. Secure enclave computing device 332 at block 346 may compute a challenge response report r_challenge comprising M', Ke, Sign(M', challenge, Ke) where Sign(M', challenge, Ke) comprises a cryptographic expression based, at least in part, on M', challenge, Ke and computed according to a private attestation key provisioned by secure enclave computing device provider 340. Secure enclave computing device 332 may then transmit message 347 comprising challenge response report r_challenge and the identifier "challenge", which may be forwarded by computing entity 330 to challenging entity 320 in message 348.

Challenging entity 320 may forward challenge response report r_challenge (obtained in received message 348) to secure enclave computing device provider 340. In an alternative implementation, challenge response report r_challenge may be forwarded to a different party such as, for example, a web services entity (not shown). Secure enclave computing device provider 340 may then apply a private attestation key provisioned by secure enclave computing device provider 340 to Sign(M', challenge, Ke) in r_challenge to recover values for M', challenge, Ke, and forward at least a recovered value for "challenge" to challenging entity 320 in message 352. Challenging entity 320 may then compare a recovered value for "challenge" received in message 352 to a value for "challenge" provided in message 342 to confirm that computation M' in attestation response report r_challenge (received in message 348) is based on the most up to date system code installed to secure enclave computing device 332. A determination of "pass" may indicate an analysis of identifier "challenge" to confirm that computation M' in attestation report r_challenge is based on a most up to date system code installed to secure enclave computing device 332, and indicate to challenging entity 320 that public key Ke in r_challenge (received in message 348) originated from secure enclave computing device 332. Responsive at least in part to a determination that attestation response report r_challenge (received in message 348) is based on a most up to date system code installed to secure enclave computing device 332, challenging entity 320 at block 354 may compare cryptographic attribute M' (obtained from r_challenge in message 350) with a signature M, which may comprise a computed cryptographic hash and/or hash digest of at least a portion of a publicly available system code (e.g., available as open source code) that is expected to be installed to secure enclave computing device 332 (e.g., to include an expected virtual machine to host a program to be loaded at block 254) as discussed above.

If challenging entity 320 comprises program input providing entity 210, determining a match at block 354 may provide at least some assurance that a virtual machine installed at secure enclave computing device 332 would prevent disclosure of secret and/or proprietary parameters (e.g., to be provided at message 272) if such secret and/or proprietary parameters were to be processed by a program hosted by the virtual machine. Likewise, if challenging entity 320 comprises program provider entity 220, determining a match at block 354 may provide at least some assurance that a virtual machine installed at secure enclave computing device 332 would prevent disclosure of secrets and/or details regarding a program provided to secure enclave computing device (e.g., at message 252) for the processing of secret and/or proprietary parameters (e.g., provided by program input provider 210).

Figure 4:
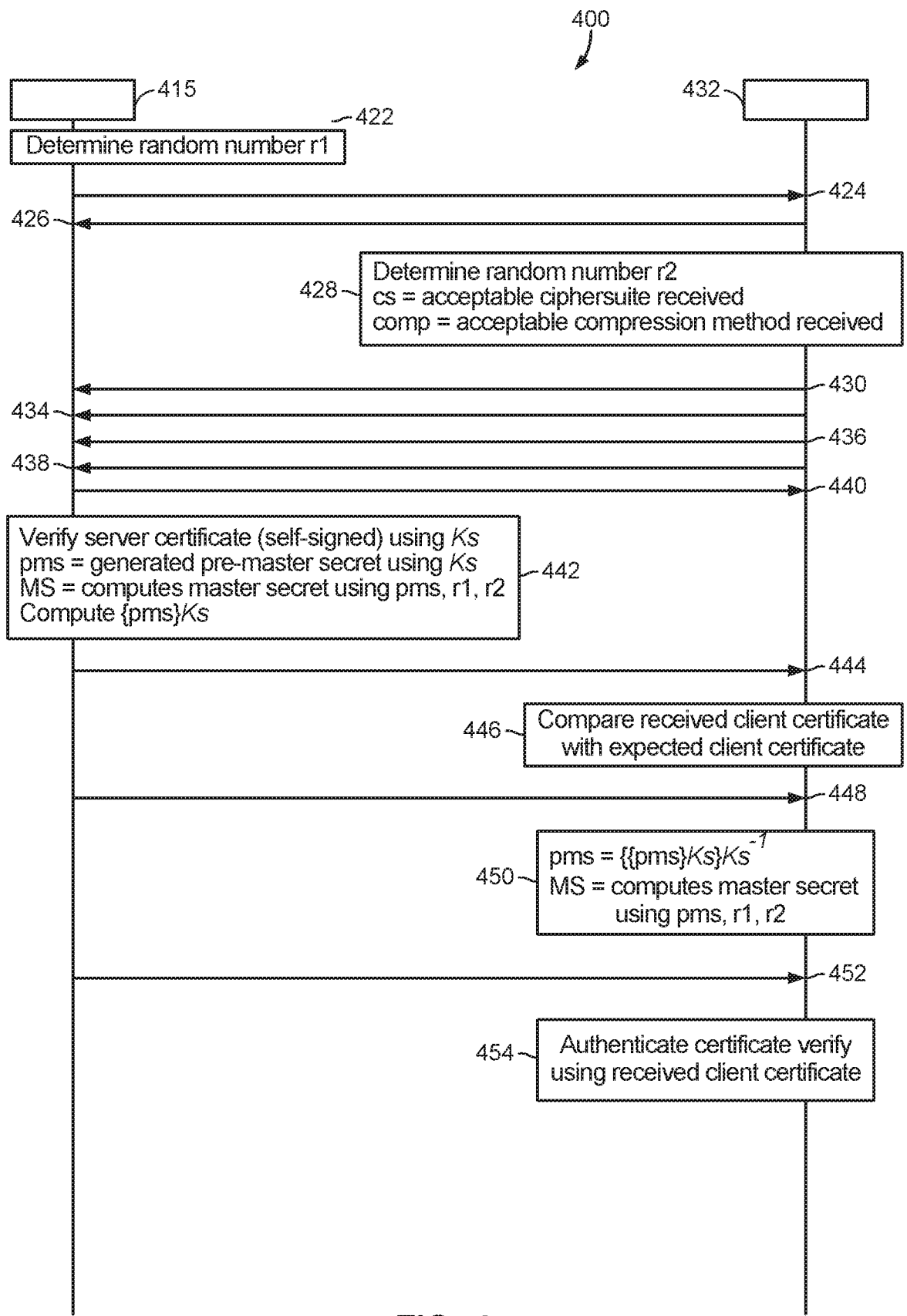

FIG. 4 is a flow diagram of an example process 400 for establishing a secure communication channel according to an embodiment. Example process 400 may comprise an implementation of aspects of secure transport procedures 250 to establish a secure communication channel between secure enclave computing device 232 and program provider entity 220 and/or aspects of secure transport procedure 260 to establish a secure communication channel between secure enclave computing device 232 and program input provider entity 220. In the presently illustrated embodiment, an initiating entity 415 may attempt to establish a secure communication channel with secure enclave computing device 432. According to an embodiment, secure enclave computing device 432 may comprise one or more aspects of secure enclave computing device 232 while initiating entity 415 may comprise one or more aspects of program provider entity 220 (e.g., in an implementation of secure transport procedure 250) and/or one or more aspects of input provider entity 210 (e.g., in an implementation of secure transport procedure 260).

At block 422, initiating entity 415 may determine a random number r1 followed by transmission of message 424 to secure enclave computing device 432 comprising signals and/or states expressing random number r1, identification of transport security technique (e.g., version of TLS or SSL protocol), list of ciphersuites and/or a list of compression methods, for example. Responsive to receipt of message 424, secure enclave computing device 432 may transmit an acknowledgement message 426 back to initiating entity 415. Based, at least in part, on random number r1 obtained from receipt of message 424, secure enclave computing device 432 at block 428 may determine a random number r2, and select a ciphersuite CS and compression method COMP from among available ciphersuites and compression methods identified in message 424. Secure enclave computing device 432 may then transmit message 430 to initiating entity 425 comprising signals and/or states expressing CS, COMP, r2 and a mutually supported transport security technique (e.g., from among candidate transport security techniques identified in message 424).

In an embodiment, secure enclave computing device 432 may form a self-signed digital certificate Certs which may be used to verify and/or authenticate ownership of public key Ks by secure enclave computing device 432. In an implementation, Certs may comprise an electronic document including one or more parameters such as, for example, a unique identifier associated with secure enclave computing device 432 in a body portion of Certs and a cryptographic hash of such a unique identifier associated with secure enclave computing device 432 computed according to private key $Ks^{-1}$ in a signature portion of Certs. Secure enclave computing device 432 may transmit a message 434 to initiating entity 415 comprising signals and/or states expressing Certs followed by a message 436 to initiating entity 415 requesting a client certificate, followed by a message 438 to initiating entity 415 indicating an end of transmission of initial parameters from secure enclave computing device 432. Initiating entity 415 may transmit message 440 to secure enclave computing device 432 indicating receipt of messages 430, 434, 436 and 438. Initiating entity 415 may then at block 442 validate a server digital certificate received in message 434 (e.g., using server public key Ks), generate a pre-master secret "pms", compute a master secret "ms" using pms, r1 and r2, and {pms}Ks.

According to an embodiment, reliance on a self-signed digital certificate Certs by initiating entity 415 may at least in part be enabled by an attestation process such as attestation process 300 shown in FIG. 3. For example, verification of r_challenge by secure enclave computing device provider 340 may enable initiating entity 415 to rely on self-signed server certificate provided at message 434. As discussed above, a challenging entity 320 may obtain in message 352 contents of r_challenge including public key Ke (e.g., following processing of r_challenge according to a private attestation key provisioned by secure enclave computing device provider 340). Thus in a particular implementation in which secure enclave computing device 432 comprises an implementation of secure enclave computing device 332 (e.g., Ks=Ke), initiating entity 415 may trust public key Ks for use in verifying Certs. and indicate to challenging entity 320 that public key Ke in r_challenge (received in message 348) originated from secure enclave computing device 332

Initiating entity 415 may transmit message 444 to secure enclave computing device 432 comprising a self-signed client certificate (e.g., $Cert_a$ if initiating entity 415 is program input provider 110 and/or 210 or $Cert_b$ if initiating entity 415 is program provider entity 120 and/or 220). At block 446, secure enclave computing device 432 may compare a self-signed client certificate obtained from received message 444 to an expected client certificate (e.g., an expected client certificate obtained during a startup process according to a mutually agreed upon policy). Initiating entity 415 may also transmit message 448 to secure enclave computing device 432 comprising signals and/or states expressing {pms}Ks as computed at block 442. At block 450, by application of private key $Ks^{-1}$, secure enclave computing device 432 may determine pms based on {pms}Ks received in message 448 as $\{\{pms\}Ks\}Ks^{-1}$. Initiating entity 415 may transmit message 452 indicating a verification of a server certificate at block 442, and secure enclave computing device 432 at block 454 may authenticate a verification of a server certificate provided in message 452 based, at least in part, on a client certificate received in message 444. Here, message 452 may be signed with a private key associated with a public key in a client certificate received in message 444. Message 456 may comprise an indication of a change in cipher technique and message 458 may indicate that initiating entity 415 is finished. Message 460 from secure enclave computing device 432 may indicate acknowledgment of receipt of messages 456 and 458, and message 462 from secure enclave computing device 432 may indicate a reversal of a change in cipher proposed in message 456.

Figure 5:
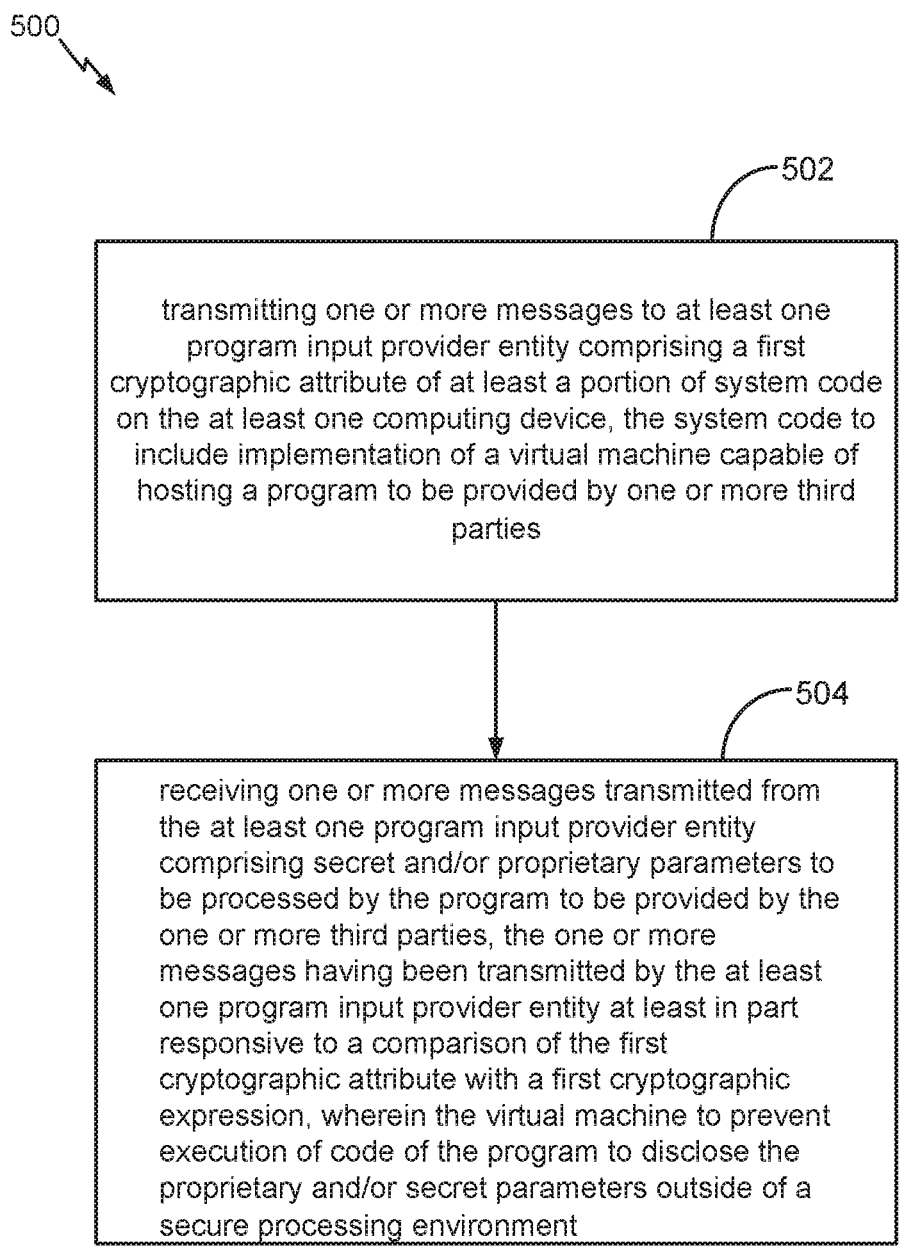
FIGS. 5 through 7 are flow diagrams of example processes to be performed by entities participating in computations to be in a delegated computing environment according to particular embodiments.

FIG. 5 is a flow diagram of an example process 500 to be performed by a secure enclave computing device in an SPE according to an embodiment such as, for example, a secure enclave computing device 132 (FIG. 1) and/or 232 (FIG. 2). Block 502 may comprise, for example, transmitting one or more messages to a program input provider entity provider entity such as, for example, program input provider entity provider entity 110 and/or 210. In this context, an "input provider entity" as referred to herein means a party that owns and/or controls secret and/or proprietary parameters, and/or computing devices and/or agents acting on behalf of a party that owns and/or controls such secret and/or proprietary parameters. Further in this context, "secret and/or proprietary parameters" as referred to herein means signals and/or states expressing content for which there is value to a party (e.g., a program input provider entity) to limit and/or prevent disclosure. Such content expressed in secret and/or proprietary parameters may include, for example, parameters, values, symbol bits, elements, characters, numbers, numerals, measurements, text, formulas images and/or records. It should be understood, however, that these are merely examples of content which may be expressed by secret and/or proprietary parameters, and claimed subject matter is not limited in this respect. Message(s) transmitted at block 502 may comprise, for example, message 346 comprising r_challenge to include parameters M', Ke, Sign (M', challenge, Ke) and identifier "challenge", where M' comprises a cryptographic attribute of at least a portion of system code loaded to secure enclave computing device 132 and/or 232. "System code" as referred to herein means signals and/or states expressing rules, instructions, actions and/or operations to at least in part control execution of a computing device. In one example, system code may include an operating system (e.g., to control run-time execution of applications and input/output operations involving peripheral devices, etc.), diagnostics, etc. In a particular implementation, system code may at least in part include an expression of rules, instructions, actions and/or operations to implement a virtual machine on one or more computing devices. It should be understood, however, that these are merely example implementations of a system code, and that claimed subject matter is not limited in this respect. A "cryptographic expression" as referred to herein means content which has been transformed, at least in part, by application of a key. In an example, implementation a cryptographic expression may comprise a "cryptographic attribute" to comprise a specific portion of a content object that has been transformed, at least in part, by application of a key. In a particular implementation, such a cryptographic attribute may comprise signals and/or states. As pointed out above, parameters provided in r_challenge may at least in part assure a recipient program input provider entity that system code installed to a secure enclave computing device includes a virtual machine (e.g., virtual machine 139) capable of hosting execution of a program to be provided by a third party such as, for example, program provider entity 120 and/or 220. For example, such a virtual machine may comprise a set of operational codes and/or instructions that prevents disclosure (e.g., by caching, printing to files, etc.) of secret and/or proprietary parameters from hosting execution of such a program by the virtual machine.

As pointed out above, program input provider entity provider entity 110 and/or 210 may exchange messages with a secure enclave computing device provider 340 to, among other things, determine an authentication of identifier "challenge," followed by a comparison of cryptographic attribute M' to cryptographic expression M as discussed above (e.g., at block 354).

Block 504 may comprise receiving one more messages transmitted from program input provider entity 110 and/or 210 comprising secret and/or proprietary parameters to be processed by a third party program. Here, execution of such a third party program may, at least in part, transform all or a portion of secret and/or proprietary parameters to provide a computing result expressed as signals and/or states to be stored in a non-transitory memory and/or transmitted in a transmission medium. Such a message received from program input provider entity 110 and/or 120 may have been transmitted by input provider entity provider entity 110 and/or 210 responsive at least in part to a comparison of a first cryptographic attribute with a first signature (e.g., comparison of cryptographic attribute M' with signature M shown in block 354). For example, such a comparison of cryptographic attribute M' with cryptographic expression M may comprise determining whether one or more features of cryptographic attribute M' matches one or more features of cryptographic expression M. Block 504 may comprise, for example, receiving message 272 from program input provider entity provider entity 110 and/or 210 comprising secret and/or proprietary parameters to be processed according to a program loaded at block 254. As pointed out above, a program loaded at block 254 may be hosted by a virtual machine to comprise a virtual machine which may prevent disclosure of secret and/or proprietary parameters received in message 272 by, for example, limiting and/or preventing execution of particular instructions of the hosted program that may disclose secret and/or proprietary parameters or computed results based, at least in part, on same.

Figure 6:
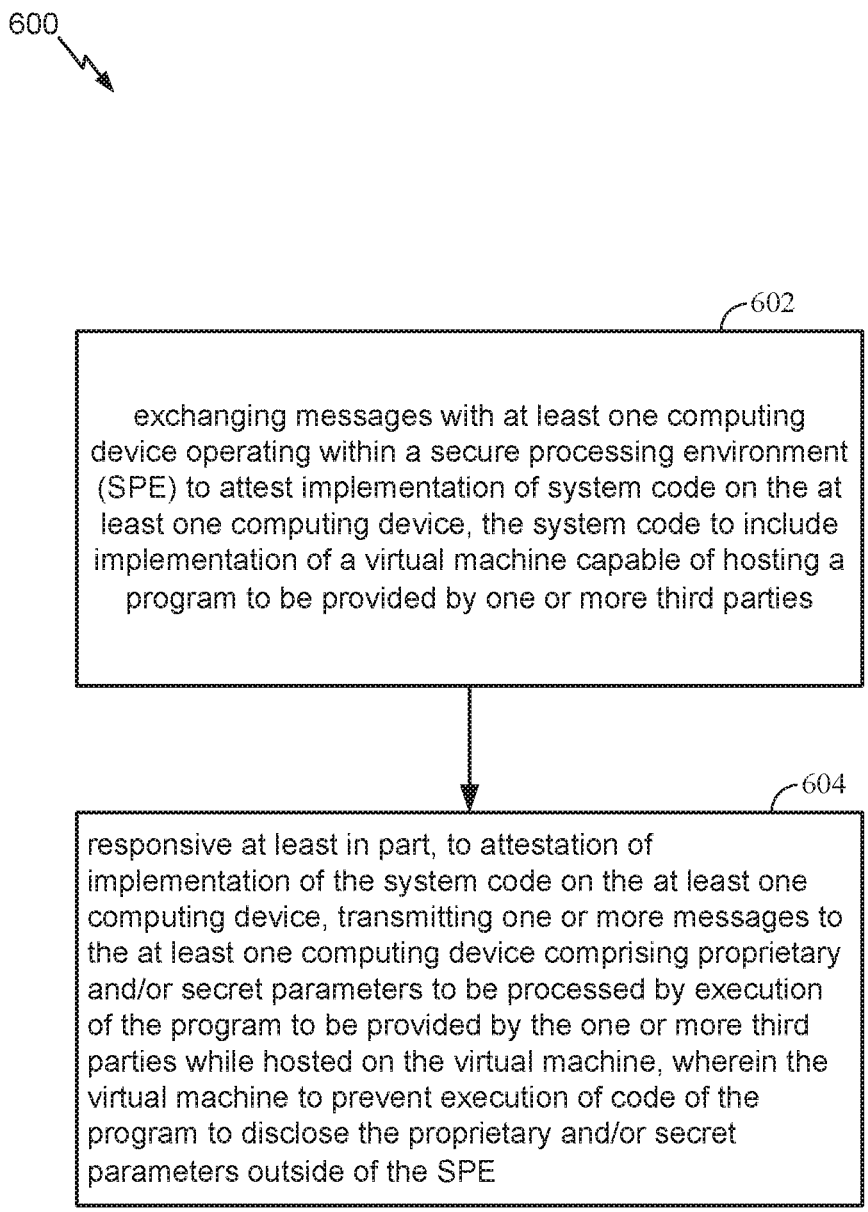

FIG. 6 is a flow diagram of a process 600 to be performed by a program input provider entity such as, for example, program input provider entity 110 and/or 210. In a particular implementation, block 602 may comprise, for example, an exchange of messages between program input provider entity 110 and/or 210 and secure enclave computing device 132 and/or 232 operating within a SPE to, at least in part, attest an implementation of a particular system code on a computing device. An SPE as referred to herein means a partition of a larger computing system that may execute concurrently with execution of other operations (e.g., operating system and/or applications) in the larger computing system outside of the partition. Furthermore, such a partition of an SPE may define an isolated area of a larger computing system guaranteeing 1) non-disclosure and integrity of system code (e.g., including a virtual machine and/or program hosted on the virtual machine) to execute in the partition, 2) non-disclosure of input parameters to be processed within the partition, 3) non-disclosure of output processing results, and 4) disclosure of intermediate processing results. In an embodiment, an exchange of messages at block 602 may comprise an exchange of messages between challenging entity 320 and secure enclave computing device 332. In this context, "attestation" and/or "to attest", as referred to herein, means to verify and/or prove a condition based, at least in part, on an observation of one or more pieces of evidence. Here, an attestation that system code (that includes executable instructions to implement a virtual machine such as virtual machine 139) is installed on secure enclave computing device 332 may occur at least in part responsive to a comparison of cryptographic attribute M' with cryptographic expression M shown in block 354.

Block 604 may comprise, for example, transmitting one or more messages by program input provider entity 110 and/or 210 to secure enclave computing device 132 and/or 232 comprising proprietary and/or secret parameters. For example, block 604 may comprise transmitting message 272 from program input provider entity provider entity 110 and/or 210 comprising secret and/or proprietary parameters to be processed according to a program loaded at block 254. As pointed out above, a program loaded at block 254 may be hosted by a virtual machine which may prevent disclosure of secret and/or proprietary parameters received in message 272 by, for example, limiting and/or preventing execution of particular instructions of the hosted program that may disclose secret and/or proprietary parameters or computed results based on same.

Figure 7:
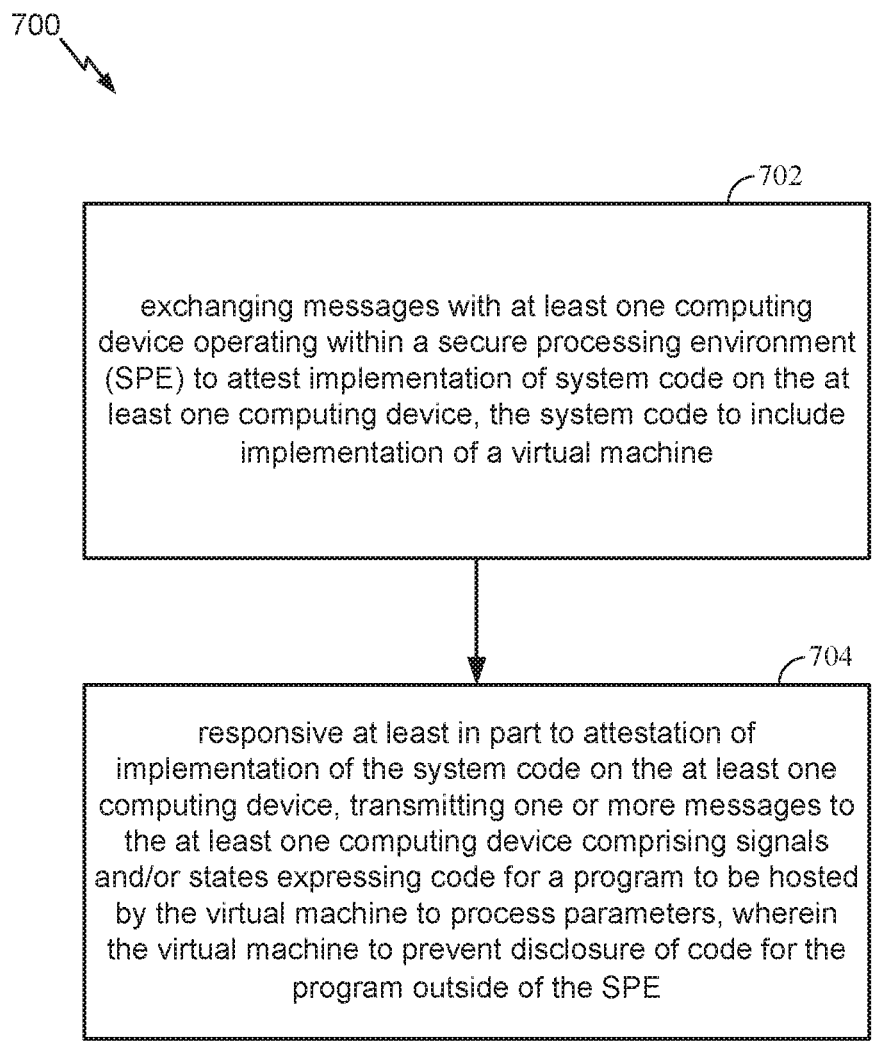

FIG. 7 is a flow diagram of a process 700 to be performed by a program provider entity such as, for example, program provider entity 120 and/or 220. Block 602 may comprise, for example, an exchange of messages between program provider entity 120 and/or 220 and secure enclave computing device 132 and/or 232 to, at least in part, attest an implementation of a particular system code on a computing device. For example, such an exchange of messages at block 702 may comprise an exchange of messages between challenging entity 320 and secure enclave computing device 332. In an embodiment, an attestation that system code (that includes executable instructions to implement a virtual machine such as virtual machine 139) is installed on secure enclave computing device 332 may occur at least in part responsive to a comparison of cryptographic attribute M' with cryptographic expression M shown in block 354.

Block 704 may comprise, for example, transmitting one or more messages by program provider entity 120 and/or 220 to secure enclave computing device 132 and/or 232 comprising signals and/or states expressing code for a program to be hosted by a virtual machine. For example, block 704 may comprise transmitting message 252 from program provider entity 120 and/or 220 to be loaded at block 254 for execution by a virtual machine.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably.

Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long-haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standarcyps and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 8:
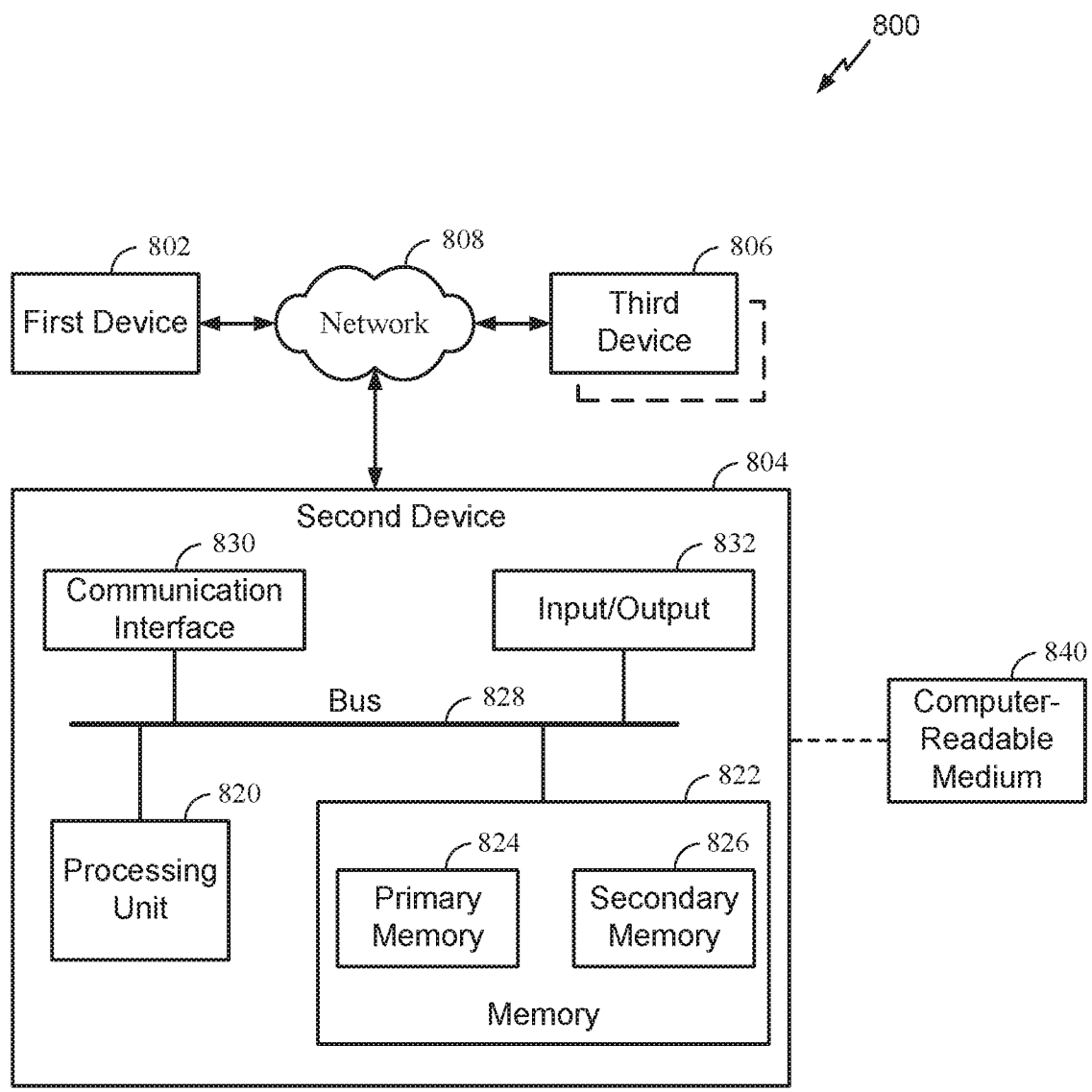
FIG. 8 is a schematic diagram illustrating an implementation of an example computing environment associated with processes to facilitate multi-party and/or delegated computing according to an embodiment.

In one example embodiment, as shown in FIG. 8, a system embodiment may comprise a local network (e.g., device 804 and medium 840) and/or another type of network, such as a computing and/or communications network. For purposes of illustration, therefore, FIG. 8 shows an embodiment 800 of a system that may be employed to implement either type or both types of networks. Network 808 may comprise one or more network connections, links, processes, services, applications, and/or resources to facilitate and/or support communications, such as an exchange of communication signals, for example, between a computing device, such as 802, and another computing device, such as 806, which may, for example, comprise one or more client computing devices and/or one or more server computing device. By way of example, but not limitation, network 808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 8 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 3 through 7 in the text associated with the foregoing figure(s) of the present patent application.

Referring now to FIG. 8, in an embodiment, first and third devices 802 and 806 may be capable of rendering a graphical user interface (GUI) for a network device and/or a computing device, for example, so that a user-operator may engage in system use. Device 804 may potentially serve a similar function in this illustration. Likewise, in FIG. 8, computing device 802 ('first device' in figure) may interface with computing device 804 ('second device' in figure), which may, for example, also comprise features of a client computing device and/or a server computing device, in an embodiment. Processor (e.g., processing device) 820 and memory 822, which may comprise primary memory 824 and secondary memory 826, may communicate by way of a communication bus 815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 804, as depicted in FIG. 8, is merely one example, and claimed subject matter is not limited in scope to this particular example. FIG. 8 may further comprise a communication interface 830 which may comprise circuitry and/or devices to facilitate transmission of messages between second device 804 and first device 802 and/or third device 806 in a physical transmission medium over network 808 using one or more network communication techniques identified herein, for example. In a particular implementation, communication interface 830 may comprise a transmitter device including devices and/or circuitry to modulate a physical signal in physical transmission medium according to a particular communication format based, at least in part, on a message that is intended for receipt by one or more recipient devices. Similarly, communication interface 830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 5D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 8, computing device 802 may provide one or more sources of executable computer instructions in the form physical states and/or signals (e.g., stored in memory states), for example. Computing device 802 may communicate with computing device 804 by way of a network connection, such as via network 808, for example. As previously mentioned, a connection, while physical, may not necessarily be tangible. Although computing device 804 of FIG. 8 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 822 may comprise any non-transitory storage mechanism. Memory 822 may comprise, for example, primary memory 824 and secondary memory 826, additional memory circuits, mechanisms, or combinations thereof may be used. Memory 822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 822 may be utilized to store a program of executable computer instructions. For example, processor 820 may fetch executable instructions from memory and proceed to execute the fetched instructions. Memory 822 may also comprise a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), comprising, for example, a program of executable computer instructions, may be executed by processor 820 and able to generate signals to be communicated via a network, for example, as previously described. Generated signals may also be stored in memory, also previously suggested.

Memory 822 may store electronic files and/or electronic documents, such as relating to one or more users, and may also comprise a computer-readable medium that may carry and/or make accessible content, including code and/or instructions, for example, executable by processor 820 and/ or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 8, processor 820 may comprise one or more circuits, such as digital circuits, to perform at least a portion of a computing procedure and/or process. By way of example, but not limitation, processor 820 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 8 also illustrates device 804 as including a component 832 operable with input/output devices, for example, so that signals and/or states may be appropriately communicated between devices, such as device 804 and an input device and/or device 804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

Embodiments described herein are directed to a method comprising: exchanging messages with at least one computing device operating within a secure processing environment (SPE) to attest implementation of system code on the at least one computing device, the system code to include implementation of a virtual machine capable of hosting execution of a program to be provided by one more third parties; and responsive at least in part, to attestation of implementation of the system code on the at least one computing device, transmitting one or more messages to the at least one computing device comprising proprietary and/or secret parameters to be processed by execution of the program to be provided by the one or more third parties while hosted on the virtual machine, wherein the virtual machine to prevent execution of code of the program to disclose the proprietary and/or secret parameters outside of the SPE. In a particular implementation, the SPE is embedded within an untrusted host server. In another particular implementation, the method further comprises comparing a cryptographic attribute of at least a portion of the system code in one or more messages transmitted by the at least one computing device with a predetermined cryptographic expression to attest implementation of the system code on the at least one computing device. In another particular implementation, the method further comprises receiving one or more messages from the at least one computing device comprising a cryptographic attribute of at least a portion of the code of the program to be hosted by the virtual machine; and transmitting one or more messages to the at least one computing device comprising the secret and/or proprietary parameters responsive at least in part to comparison of the cryptographic attribute to a cryptographic. In another particular implementation, exchanging messages with the at least one computing device further comprises: transmitting a challenge message to the at least one computing device, the challenge message to comprise a challenge value; and receiving on or more messages transmitted from the at least one computing device comprising an attestation report, the attestation report to comprise one or more cryptographic expressions based, at least in part, on the challenge value, and wherein the method further comprises: transmitting one or more authentication request messages to a secure enclave computing device provider comprising at least one of the one or more cryptographic expressions; and obtaining an authentication status indication from an authentication response message received from the secure enclave computing device provider, the authentication status indication to have been determined by the based, at least in part, the at least one of the one or more cryptographic expressions.

Other embodiments described herein are directed to an apparatus comprising: a transceiver device to transmit messages to and receive messages from a physical transmission medium; and one or more processors to: exchange messages with at least one computing device operating within a secure processing environment (SPE) via the transceiver device to attest implementation of system code on the at least one computing device, the system code to include implementation of a virtual machine capable of hosting execution of a program to be provided by one more third parties; and responsive at least in part, to attestation of implementation of the system code on the at least one computing device, initiate transmission of one or more messages through the transceiver device to the at least one computing device comprising proprietary and/or secret parameters to be processed by execution of the program to be provided by the one or more third parties while hosted on the virtual machine, wherein the virtual machine to prevent execution of code of the program to disclose the proprietary and/or secret parameters outside of the SPE.

Other embodiments described herein are directed to an article comprising: a non-transitory storage medium comprising computer-readable instructions stored thereon which are executable by a computing device to: exchange messages with at least one computing device operating within a secure processing environment (SPE) to attest implementation of system code on the at least one computing device, the system code to include implementation of a virtual machine capable of hosting execution of a program to be provided by one or more third parties; and responsive at least in part, to attestation of implementation of the system code on the at least one computing device, initiate transmission of one or more messages to the at least one computing device comprising proprietary and/or secret parameters to be processed by execution of the program to be provided by the one or more third parties while hosted on the virtual machine, wherein the virtual machine to prevent execution of code of the program to disclose the proprietary and/or secret parameters outside of the SPE.

Other embodiments described herein are directed to a method comprising: exchanging messages with at least one computing device operating within a secure processing environment (SPE) to attest implementation of system code on the at least one computing device, the system code to include implementation of a virtual machine; and responsive at least in part to attestation of implementation of the system code on the at least one computing device, transmitting one or more messages to the at least one computing device comprising signals and/or states expressing code for a program to be hosted by the virtual machine to process parameters, wherein the system code to prevent disclosure of code for the program outside of the SPE. In one particular implementation, the SPE is embedded within an untrusted host server. In another particular implementation, the method further comprises comparing a cryptographic attribute of at least a portion of the system code in one or more messages transmitted by the at least one computing device with a predetermined cryptographic expression to attest implementation of the system code on the at least one computing device. In yet another particular implementation, the method further comprises receiving one or more messages from the at least one computing device comprising a cryptographic attribute of at least a portion of the code of the program to be hosted by the virtual machine; and transmitting one or more messages to the at least one computing device comprising the signals and/or states expressing the code for the program responsive at least in part to comparison of the cryptographic attribute to a cryptographic. In yet another particular implementation, exchanging messages with the at least one computing device further comprises: transmitting a challenge message to the at least one computing device, the challenge message to comprise a challenge value; and receiving on or more messages transmitted from the at least one computing device comprising an attestation report, the attestation report to comprise one or more cryptographic expressions based, at least in part, on the challenge value, and wherein the method further comprises: transmitting one or more authentication request messages to a secure enclave computing device provider comprising at least one of the one or more cryptographic expressions; and obtaining an authentication status indication from an authentication response message received from the secure enclave computing device provider, the authentication status indication to have been determined by the based, at least in part, the at least one of the one or more cryptographic expressions.

Other embodiments described herein are directed to An apparatus comprising: a transceiver device to transmit messages to and receive messages from a physical transmission medium; and one or more processors to: exchange messages with at least one computing device operating within a secure processing environment (SPE) via the transceiver device to attest implementation of system code on the at least one computing device, the system code to include implementation of a virtual machine; and responsive at least in part to attestation of implementation of the system code on the at least one computing device, initiate transmission of one or more messages through the transceiver device to the at least one computing device comprising signals and/or states expressing code for a program to be hosted by the virtual machine to process parameters, wherein the system code to prevent disclosure of code for the program outside of the SPE.

Other embodiments described herein are directed to an article comprising: a non-transitory storage medium comprising computer readable instructions stored thereon which are executable by a computing device to: exchange messages with at least one computing device operating within a secure processing environment (SPE) to attest implementation of system code on the at least one computing device, the system code to include implementation of a virtual machine; and responsive at least in part to attestation of implementation of the system code on the at least one computing device, initiate transmission of one or more messages to the at least one computing device comprising signals and/or states expressing code for a program to be hosted by the virtual machine to process parameters, wherein the system code to prevent disclosure of code for the program outside of the SPE.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
    transmitting one or more messages over a communication network to at least one program provider entity comprising a first cryptographic attribute of at least a portion of system code on at least one computing device, the system code to include implementation of a virtual machine capable of hosting a program to be provided by the at least one program provider entity; and
    receiving one or more messages transmitted from the at least one program provider entity over the communication network comprising code of a program to be hosted by the virtual machine, the one or more messages having been transmitted over the communication network by the at least one program provider entity at least in part responsive to a comparison of the first cryptographic attribute with a first cryptographic expression to confirm that a version of system code is installed in a secure processing environment (SPE) to at least in part implement the virtual machine,
    wherein the system code to prevent disclosure of code of the program outside of the SPE.

2. The method according to claim 1, and further comprising:
    transmitting one or more messages to at least one program input provider entity comprising a second cryptographic attribute of at least a portion of the code of the program to be executed by the virtual machine; and
    receiving one or more messages transmitted from the at least one program input provider entity comprising secret and/or proprietary parameters to be processed by the program, the one or more messages having been transmitted by the at least one program input provider entity at least in part responsive to a comparison of the second cryptographic attribute with a second cryptographic expression,
    wherein the virtual machine to prevent execution of code of the program to disclose the secret and/or proprietary parameters outside of the SPE.

3. The method of claim 2, and further comprising:
    loading code of the program to be hosted by the virtual machine;
    transmitting one or more messages to the at least one program input provider entity comprising the second cryptographic expression of the at least a portion of the code of the program to be executed by the virtual machine; and
    obtaining, from one or more messages transmitted from the at least one program input provider entity, signals and or states expressing the secret and/or proprietary parameters, the one or more messages having been transmitted by the at least one program input provider entity at least in part responsive to comparison of the second cryptographic expression of the at least a portion of the loaded code of the program with the second cryptographic attribute.

4. The method of claim 1, and further comprising:
receiving the one or more messages transmitted from the at least one program provider entity in a transport layer security session.

5. The method of claim 1, wherein the virtual machine to comprise a subset of operation codes of a compiler, the virtual machine to omit one or more operation codes of the compiler based, at least in part, on at least one vulnerability of the at least one computing device to execution of the omitted one or more operation codes of the compiler.

6. The method of claim 1, and further comprising:
transmitting one or more challenge messages to a secure enclave computing device embedded in the SPE, the one or more challenge messages comprising a challenge value; and
receiving of one or messages from the secure enclave computing device comprising the first cryptographic attribute, the one or more or messages from the secure enclave computing device comprising the first cryptographic attribute having been transmitted at least in part responsive to receipt of the one or more challenge messages.

7. The method of claim 1, wherein the first cryptographic attribute comprises a cryptographic hash and/or hash digest of the at least a portion of the system code.

8. An apparatus comprising:
a transceiver device to transmit messages to and receive messages from a physical transmission medium; and
one or more processors to:
initiate transmission of one or more messages through the transceiver device over a communication network to at least one program provider entity, the one or more transmitted messages to comprise a first cryptographic attribute of at least a portion of system code on the at least one computing device, the system code to include implementation of a virtual machine capable of hosting a program to be provided by the at least one program provider entity; and
obtain one or more messages received at the transceiver device and transmitted from the at least one program provider entity over the communication network comprising code of a program to be hosted by the virtual machine, the one or more messages having been transmitted by the at least one program provider entity at least in part responsive to a comparison of the first cryptographic attribute with a first cryptographic expression to confirm that a version of system code is installed in a secure processing environment to at least in part implement the virtual machine,
wherein the system code to prevent disclosure of the code of the program outside of a secure processing environment (SPE).

9. The apparatus according to claim 8, wherein the one or more processors are further to:
initiate transmission of one or more messages through the transceiver device to at least one program input provider entity comprising a second cryptographic attribute of at least a portion of the code of the program to be hosted by the virtual machine; and
obtain one or more messages transmitted from the at least one program input provider entity and received at the transceiver device comprising secret and/or proprietary parameters to be processed by the program to be executed by the virtual machine, the one or more messages to have been transmitted by the at least one program provider entity at least in part responsive to a comparison of the second cryptographic attribute with a second cryptographic expression,
wherein the virtual machine to prevent execution of code of the program to disclose secret and/or proprietary parameters outside of the SPE.

10. The apparatus of claim 9, wherein the one or more processors further to:
load code of the program to be provided by the at least one program provider entity and hosted by the virtual machine;
initiate transmission of one or more messages through the transceiver device to the at least one program input provider entity comprising the second cryptographic expression of at least a portion of the code of the program to be provided by the at least one program provider entity and hosted by the virtual machine; and
obtain, from one or more messages received at the transceiver device and transmitted from the at least one program input provider entity, signals and/or states expressing secret and/or proprietary parameters, the one or more messages having been transmitted by the at least one program input provider entity at least in part responsive to comparison of the second cryptographic expression of the at least a portion of the loaded code of the program with a cryptographic value.

11. The apparatus of claim 8, wherein the one or more processors are further to:
obtain the one or more messages received at the transceiver device and transmitted from the at least one program provider entity in a transport layer security session.

12. The apparatus of claim 8, wherein the virtual machine to comprise a subset of operation codes of a compiler, the virtual machine to omit one or more operation codes of the compiler based, at least in part, on at least one vulnerability of the at least one computing device to execution of the omitted one or more operation codes of the compiler.

13. The apparatus of claim 8, wherein the one or more processors are further to:
initiate transmission of one or more challenge messages through to a secure enclave computing device embedded in the SPE, the one or more challenge messages comprising a challenge value; and
obtain from one or messages received from the secure enclave computing device to comprise the first cryptographic attribute, the one or more or messages from the secure enclave computing device to comprise the first cryptographic attribute having been transmitted at least in part responsive to receipt of the one or more challenge messages.

14. The apparatus of claim 8, wherein the first cryptographic attribute to comprise a cryptographic hash and/or hash digest of the at least a portion of the system code.

15. An article comprising:
a non-transitory storage medium comprising computer-readable instructions stored thereon which executable by a computing device to:
initiate transmission of one or more messages over a communication network to at least one program provider entity comprising a first cryptographic attribute of at least a portion of system code on the at least one computing device, the system code to include implementation of a virtual machine capable of hosting a program to be provided by the at least one program provider entity; and obtain from one or more received messages transmitted over the communication network from the at least one program provider entity comprising code of a program to be hosted by the virtual machine, having been transmitted from the at least one program provider entity at least in part responsive to a comparison of the first cryptographic attribute with a first cryptographic expression to confirm that a version of system code is installed in a secure processing environment to at least in part implement the virtual machine, wherein the system code to prevent disclosure of code of the program outside of a secure processing environment (SPE).

16. The article according to claim 15, wherein the instructions are further executable by the computing device to:

initiate transmission of one or more messages to at least one program input provider entity comprising a second cryptographic attribute of at least a portion of the code of the program to be hosted by the virtual machine; and obtain one or more messages transmitted from the at least one program input provider entity and received at the computing device comprising secret and/or proprietary parameters to be processed by the program, the one or more messages to have been transmitted by the at least one program input provider entity at least in part responsive to a comparison of the second cryptographic attribute with a second cryptographic expression, wherein the virtual machine to prevent execution of code of the program to disclose the secret and/or proprietary parameters outside of the SPE.

17. The article of claim 16, wherein the instructions are further executable by the computing device to:

load the code of the program to be hosted by the virtual machine;

initiate transmission of one or more messages to the at least one program input provider entity comprising a cryptographic expression of at least a portion of the code of the program to be hosted by the virtual machine; and obtaining, from one or more messages received from the at least one program input provider entity, signals and/or states expressing secret and/or proprietary parameters, the one or more messages having been transmitted by the at least one program input provider entity at least in part responsive to comparison of the cryptographic expression of the at least a portion of the loaded code of the program with a cryptographic value.

18. The article of claim 15, wherein the instructions are further executable by the computing device to:

obtain the one or more messages transmitted from the at least one program provider entity in a transport layer security session.

19. The article of claim 15, wherein the virtual machine to comprise a subset of operation codes of a compiler, the virtual machine to omit one or more operation codes of the compiler based, at least in part, on at least one vulnerability of the at least one computing device to execution of the omitted one or more operation codes of the compiler.

20. The article of claim 15, wherein the instructions are further executable by the computing device to:

initiate transmission of one or more challenge messages to a secure enclave computing device embedded in the SPE, the one or more challenge messages to comprise a challenge value; and obtain from one or messages received from the secure enclave computing device comprising the first cryptographic attribute, the one or more or messages from the secure enclave computing device to comprise the first cryptographic attribute having been transmitted at least in part responsive to receipt of the one or more challenge messages.

21. The article of claim 15, wherein the first cryptographic attribute to comprise a cryptographic hash and/or hash digest of the at least a portion of the system code.

* * * * *